United States Patent [19]

Entenmann et al.

[11] Patent Number: 5,398,540
[45] Date of Patent: Mar. 21, 1995

[54] KNOCK SENSOR

[75] Inventors: Robert Entenmann, Benningen; Joerg Bonitz, Muehlacker; Stefan Unland, Schwieberdingen; Romuald Fries, Ditzingen-Heimerdingen; Robert Sloboda, Markgroeningen; Klaus Schenk, Bietigheim-Bissingen; Karl Dums, Renninger-Malmsheim, all of Germany

[73] Assignee: Robert Bosch GmbH, Stuttgart, Germany

[21] Appl. No.: 75,523

[22] Filed: Jun. 11, 1993

[30] Foreign Application Priority Data

Jul. 18, 1991 [DE] Germany ............... 41 23 786.2

[51] Int. Cl.⁶ ........................................... G01L 23/22
[52] U.S. Cl. ....................................................... 73/35
[58] Field of Search ................ 73/35, 654; 123/425, 123/435

[56] References Cited

U.S. PATENT DOCUMENTS

| 4,660,409 | 4/1987 | Miyata ........................... 73/35 |
| 4,966,031 | 6/1989 | Mochizuki . | |
| 4,978,883 | 12/1990 | Komurasaki ..................... 73/35 |

FOREIGN PATENT DOCUMENTS 0324187 7/1989 European Pat. Off. .

Primary Examiner—Hezron E. Williams
Assistant Examiner—Christine K. Oda
Attorney, Agent, or Firm—Michael J. Striker

[57] ABSTRACT

A knock sensor for indirect or direct fixing to an internal combustion engine has a housing (10) with a pressure sleeve (11) on the outer side of which a piezoceramic disk, a seismic mass (16), the contact disks (14), and the insulating disks (13) are arranged. The insulating disks (13) or the piezoelectrical disk (15) are or is made slightly electrically conductive so that the voltage spikes which occur due to the pyroelectrical effect can be easily eliminated. In this way, faulty measuring and interference can be avoided in the electrical circuit connected to the knock sensor.

25 Claims, 1 Drawing Sheet

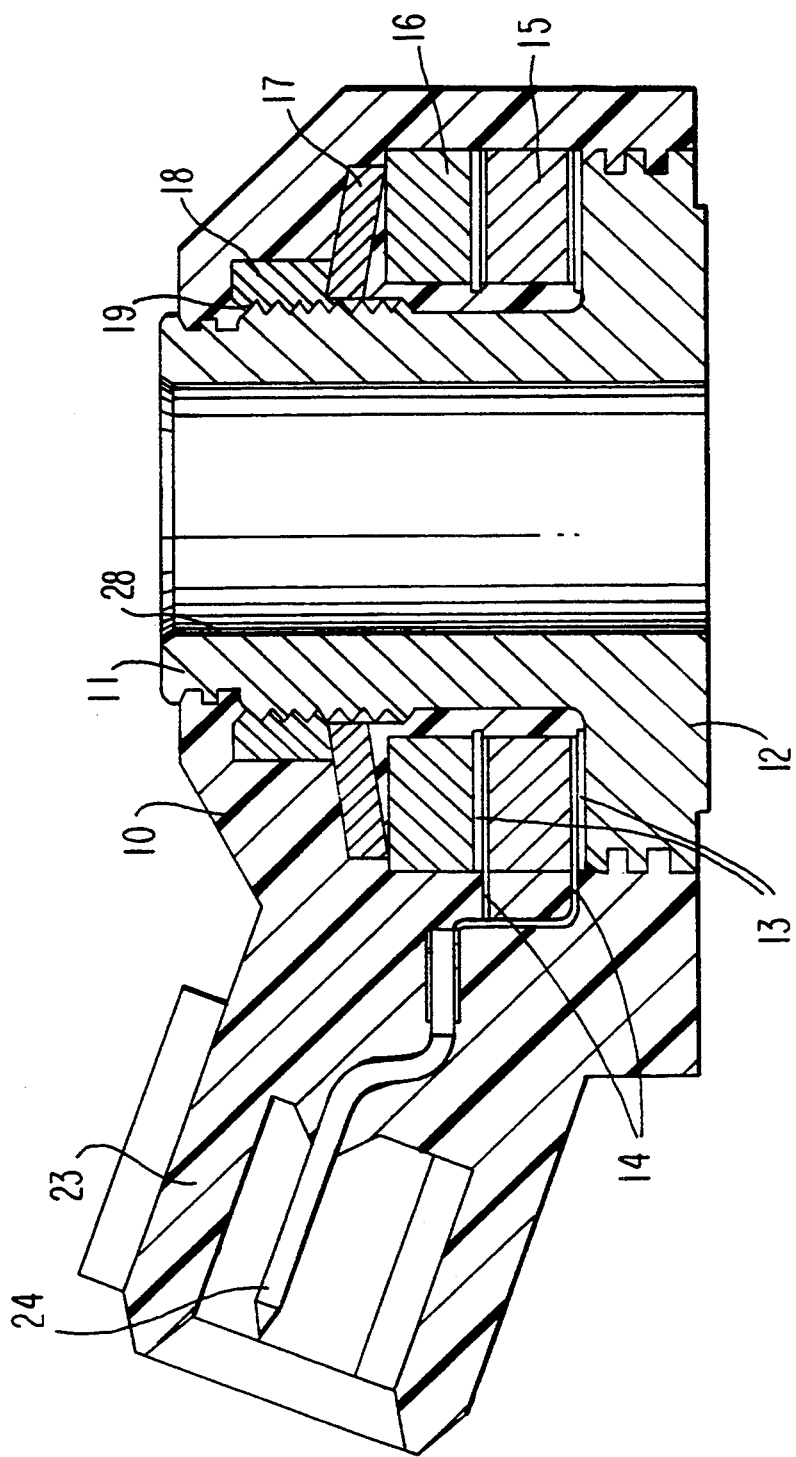

KNOCK SENSOR

BACKGROUND OF THE INVENTION

The invention relates to a knock sensor for an internal combustion engine. In such a knock sensor, for example one as known from the U.S. Pat. No. 4,966,031, the piezoelectric disk is arranged between two contact disks, each of which is covered by an insulating disk. In all cases, however, these insulating disks consist of electrically non-conductive material. However, in piezo-electrical materials, it is possible at high temperatures, in particular during temperature changes, for electrical charging to take place which can result in high electrical voltages. This can possibly result in faulty measuring and interference in the connected circuit.

SUMMARY OF THE INVENTION

It is an object of the present invention to provide a piezoelectric knock sensor which eliminates the above-described disadvantages.

According to the invention, the knock sensor comprises a housing having a support surface; arranged in the housing at least one piezoelectrical element arranged between contact disks; a seismic mass acting on the at least one piezoelectrical element in the housing); and at least one insulating disk between the support surface and one of the contact disks and/or at least one other insulating disk arranged between the seismic mass and the other contact disk, wherein the insulating disks are made of electrically conductive material having an electrical conductivity less than that of the contact disks so as to eliminate electrical charges generated by a pyroelectric effect and/or the at least one piezoelectrical element is doped with an electrically conductive material, advantageously either niobium and/or antimony. The insulating disks are advantageously made from polyethyleneterephthalate with an additive material containing carbon or metal.

In a preferred embodiment the electrical conductivity of the piezoelectrical elements and/or the insulating disks is from 100 kiloohms to 1 gigaohm. The at least one piezoelectrical element can advantageously be a piezoceramic element.

In contrast, the knock sensor in accordance with the invention has the advantage that a leakage resistance is possible for the charges generated by the pyroelectrical effect, without any additional components or modification of the existing production facilities. These interfering charges can be discharged in a particularly cost-effective way. The accuracy of the knock sensor and its susceptibility to interference can thereby be decisively improved.

BRIEF DESCRIPTION OF THE DRAWING

An embodiment example of the invention is shown in the drawing and is more closely explained in the description which follows. The sole figure shows a longitudinal section through a knock sensor.

DESCRIPTION OF THE PREFERRED EMBODIMENT

The knock sensor presented in the illustration shows a housing 10 within which a pressure sleeve 11 is arranged, which has a flange-type shoulder 12 near its lower end. At the outer circumference of this pressure sleeve 11, starting from the shoulder 12, the following parts are arranged: an insulating disk 13, a contact disk 14, and a piezoceramic disk 15, and then, in reverse order, a second contact disk 14 and a second insulating disk 13. A seismic mass 16 is arranged on top of this. These named parts are acted upon by a disk spring 17, preloaded by a threaded ring 18 which is screwed onto an external thread 19 at the upper part of the pressure sleeve 11.

Flat connectors 24 are injection molded in the integrated connection plug 23 of the housing 10 which is of plastic material, manufactured in particular by the injection molding process. The flat connectors 24 are connected to the two contact disks. 14. A fixing screw, which is not shown, and by which the knock sensor can be indirectly or directly fixed to an internal combustion engine, projects through the hole 28 of the pressure sleeve 11, thereby allowing the knock sensor to also act as a washer.

The entire torque exerted by the fixing screw is transferred to the pressure sleeve 11, which means that no force from the fixing screw acts on the piezoceramic disk 15. The threaded ring 18 allows the preloading force of the disk spring 17 to be set such that axial forces which are just tolerable, since they do not permanently impair the piezoceramic disk's electrical signal, act on the piezoceramic disk and that this disk is largely independent of thermal expansions and unavoidable compression deformation of the pressure sleeve during assembly. In the piezoceramic disk 15, the impulses exerted by the seismic mass proportionately to the vibrations of the internal combustion engine are converted into currents which can be read on an appropriate measuring instrument.

The contact disks 14 are made of electrically conductive material in a known fashion. In contrast to previous solutions, the two insulating disks 13 are also made of slightly conductive material. This electrical conductivity must be lower than that of the contact disks 14. It should approximately be in the range of 100 k$\Omega$ to 1 G$\Omega$. This low conductivity of the insulating disks 13 can be achieved in a simple manner by admixing electrically conductive additives to the material hitherto used. For example, it is thus possible to add to the insulating disks which have previously consisted of polyethyleneterephthalate an additive containing carbon or metal. The particular proportion of ingredients will then determine the desired resistance level and the desired conductivity of the insulating disks 13. In this process, the insulating disks 13 should be developed to only such level of conductivity that they can eliminate spikes which occur due to the pyroelectrical effect of the piezoceramic disk 15.

In another embodiment, it would alternatively be possible to continue manufacturing the insulating disk 13 of electrically non-conductive material, but to dope the piezoceramic disk 15, in particular the shoulder region, with electrically conductive ions. As is known, piezoceramic disks are made by the sintering process. The doping, for example with the elements niobium, antimony, can be carried out in a fashion known from the semiconductor technology, by appropriate control of the ceramic fire. In a further alternative, it would be possible to combine both above mentioned design types with each other in a knock sensor and thus make the insulating disks 13 to be electrically slightly conductive and to dope the piezoceramic disk with electrically conductive substances. The embodiments described above are not limited to the use of piezoceramic disks for the purpose of obtaining a measuring signal, but they can also be used for all other elements which operate on the piezoelectrical principle.

While the invention has been illustrated and described in a piezoelectrical knock sensor having improved electrical properties, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. Knock sensor for an internal combustion engine, said knock sensor comprising
   a housing (10);
   at least one piezoelectrical element (15) arranged between contact disks (14), said at least one piezoelectrical element (15) and said contact disks (14) residing in said housing (10);
   a seismic mass (16) for picking up vibrations of the internal combustion engine, said seismic mass being positioned to act on said at least one piezoelectrical element (15); and
   at least one insulating disk (13) arranged between a support surface in said housing and one of said contact disks (14) and at least one other insulating disk (13) arranged between said seismic mass (16) and another of said contact disks (14),
   wherein said at least one insulating disk (13) and said at least one other insulating disk (13) are made of electrically conductive material having an electrical conductivity less than that of said contact disks (14) but large enough to eliminate electrical charges generated by a pyroelectric effect.

2. Knock sensor as defined in claim 1, wherein said at least one insulating disk (13) and said at least one other insulating disk (13) each have a resistance of 100 kiloohms to 1 gigaohm.

3. Knock sensor as defined in claim 1, wherein said at least one insulating disk (13) and said at least one other insulating disk (13) each consist of polyethyleneterephthalate containing an additive member comprising at least one metal.

4. Knock sensor as defined in claim 1, further comprising a pressure sleeve (11) provided with a throughgoing bore (28) and located in said housing (10) and a disc spring (17) located in said housing; and wherein said pressure sleeve, said at least one piezoelectrical element (15) and said seismic mass (16) are dimensioned and positioned so that said at least one piezoelectrical element (15) and said seismic mass (16) are held on said pressure sleeve by said disc spring (17), and said pressure sleeve with said throughgoing bore provides means for securing said housing to the internal combustion engine.

5. Knock sensor as defined in claim 4, wherein said sleeve has a flange-type shoulder on which said support surface is located and said at least once piezoelectrical element and said seismic mass are supported on said support surface of said shoulder.

6. Knock sensor as defined in claim 5, further comprising a threaded ring (18) and wherein said pressure sleeve is provided with a circumferential thread (19) on which said threaded ring (18) is screwed so that said threaded ring (18) preloads said disc spring (17).

7. Knock sensor as defined in claim 1, wherein said at least one piezoelectrical element is a piezoceramic element.

8. Knock sensor as defined in claim 1, wherein said at least one insulating disk (13) and said at least one other insulating disk (13) each consist of polyethyleneterephthalate containing an additive comprising carbon.

9. Knock sensor for an internal combustion engine, said knock sensor comprising
   a housing (10);
   at least one piezoelectrical element (15) arranged between contact disks (14), said at least one piezoelectrical element (15) and said contact disks (14) residing in said housing (10);
   a seismic mass (16) for picking up vibrations of the internal combustion engine, said seismic mass being located so as to act on said at least one piezoelectrical element (15); and
   at least one insulating disk (13) arranged between a support surface (12) in said housing and one of said contact disks (14) and at least one other insulating disk (13) arranged between said seismic mass (16) and another of said contact disks (14),
   wherein said at least one piezoelectrical element (15) is doped with an electrically conductive material so as to eliminate electrical charges generated by a pyroelectric effect.

10. Knock sensor as defined in claim 9, wherein said electrically conductive material comprises niobium and antimony.

11. Knock sensor as defined in claim 9, wherein said at least one piezoelectrical element has a resistance of 100 kiloohms to 1 gigaohm.

12. Knock sensor as defined in claim 9, further comprising a pressure sleeve (11) provided with a throughgoing bore (28) and located in said housing (10) and a disc spring (17) located in said housing, and wherein said pressure sleeve, said at least one piezoelectrical element (15) and said seismic mass (16) are dimensioned and positioned so that said at least one piezoelectrical element (15) and said seismic mass (16) are held on said pressure sleeve by said disc spring (17), and said pressure sleeve with said throughgoing bore provides means for securing said housing to said internal combustion engine.

13. Knock sensor as defined in claim 12, wherein said sleeve has a flange-like shoulder (12) on which said support surface is located and said at least one piezoelectrical element and said seismic mass are supported on said support surface.

14. Knock sensor as defined in claim 13, further comprising a threaded ring (18) and wherein said pressure sleeve is provided with a circumferential thread (19) on which said threaded ring (18) is screwed so that said threaded ring (18) preloads said disc spring (17).

15. Knock sensor as defined in claim 9, wherein said at least one piezoelectrical element is a piezoceramic element.

16. Knock sensor as defined in claim 9, wherein said electrically conductive material comprises niobium.

17. Knock sensor as defined in claim 9, wherein said electrically conductive material comprises antimony.

18. Knock sensor for an internal combustion engine, said knock sensor comprising a housing (10);

at least one piezoelectrical element (15) arranged between contact disks (14), said at least one piezoelectrical element (15) and said contact disks (14) residing in said housing (10);

a seismic mass (16) for picking up vibrations of the internal combustion engine, said seismic mass being located so as to act on said at least one piezoelectrical element (15); and at least one insulating disk (13) arranged between a support surface in said housing and one of said contact disks (14) and at least one other insulating disk (13) arranged between said seismic mass (16) and another of said contact disks (14), wherein said at least one insulating disk (13) and said at least one other insulating disk (13) consist of electrically conductive material having an electrical conductivity less than that of said contact disks (14) and said at least one piezoelectrical element (15) is doped with an electrically conductive material so as to eliminate electrical charges generated by a pyroelectric effect.

19. Knock sensor as defined in claim 18, wherein said at least one insulating disk (13) and said at least one other insulating disk (13) each have a resistance of 100 kiloohms to 1 gigaohm.

20. Knock sensor as defined in claim 18, wherein said at least one insulating disk (13) and said at least one other insulating disk (13) each consist of polyethyleneterephthalate containing an additive including at least one metal.

21. Knock sensor as defined in claim 18, further comprising a pressure sleeve (11) provided with a throughgoing bore (28) and located in said housing (10) and a disc spring (17) located in said housing, and wherein said pressure sleeve, said at least one piezoelectrical element (15) and said seismic mass (16) are dimensioned and positioned so that said at least one piezoelectrical element (15) and said seismic mass (16) are held on said pressure sleeve by said disc spring (17), and said pressure sleeve with said throughgoing bore provides means for securing said housing to said internal combustion engine.

22. Knock sensor as defined in claim 21, wherein said pressure sleeve has a flange-like shoulder (12) on which said support surface is provided and said at least one piezoelectrical element and said seismic mass are supported on said support surface.

23. Knock sensor as defined in claim 22, further comprising a threaded ring (18) and wherein said pressure sleeve is provided with a circumferential thread (19) on which said threaded ring (18) is screwed so that said threaded ring (18) preloads said disc spring (17).

24. Knock sensor as defined in claim 18, wherein said at least one piezoelectrical element is a piezoceramic element.

25. Knock sensor as defined in claim 18, wherein said insulating disks (13) said at least one insulating disk (13) and said at least one other insulating disk (13) each consist of polyethyleneterephthalate containing an additive comprising carbon.

* * * * *